UNITED STATES PATENT OFFICE.

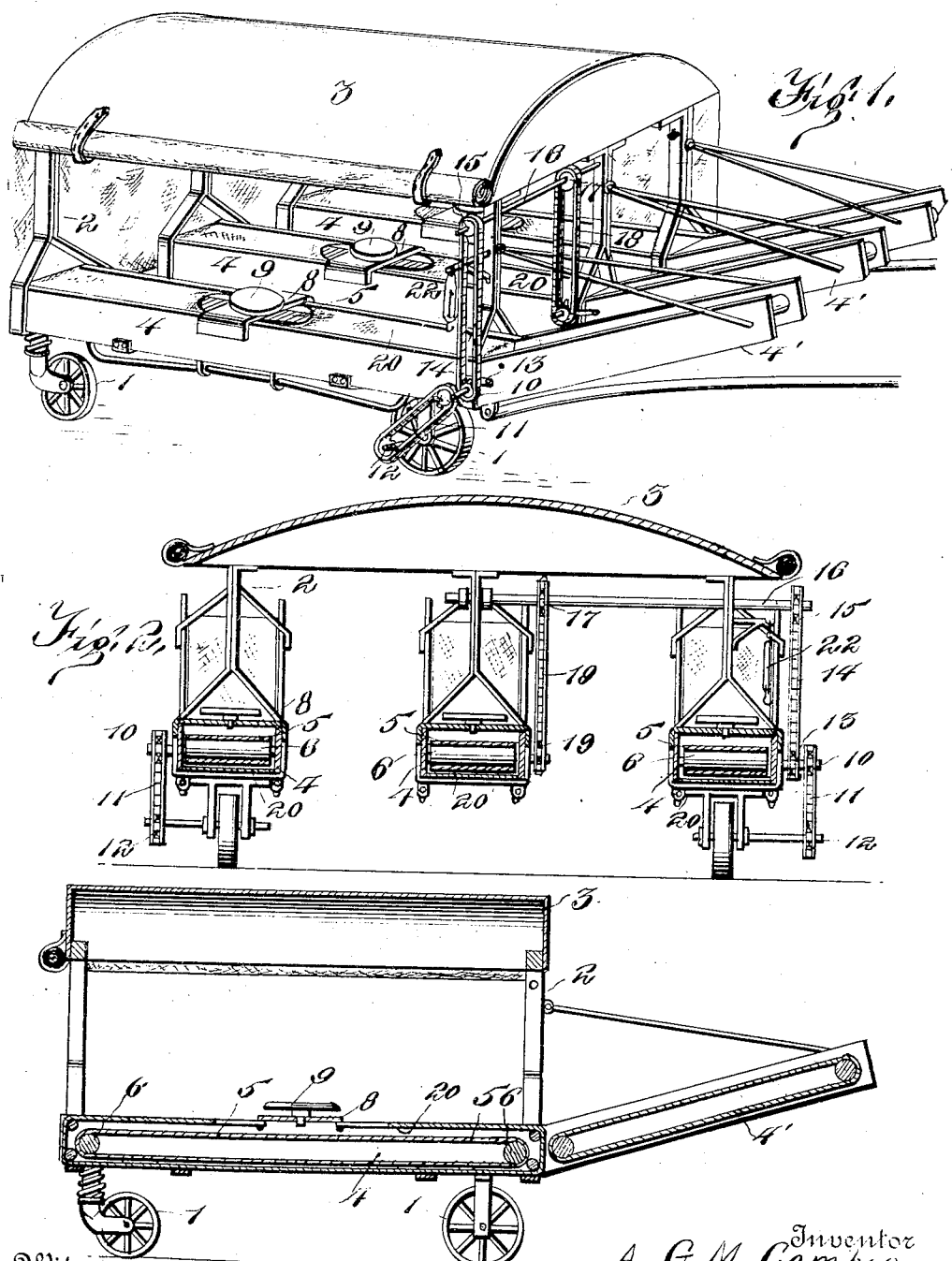

AUGUSTUS G. M. COMBEE, OF ROME, GEORGIA.

COTTON-HARVESTER.

No. 823,034.　　　　Specification of Letters Patent.　　　　Patented June 12, 1906.

Application filed July 20, 1905. Serial No. 270,514.

*To all whom it may concern:*

Be it known that I, AUGUSTUS G. M. COMBEE, a citizen of the United States, residing at Rome, in the county of Floyd and State of Georgia, have invented certain new and useful Improvements in Cotton-Harvesters; and I do declare the following to be a full, clear, and exact description of the invention, such as will enable others skilled in the art to which it appertains to make and use the same.

This invention relates to improvements in cotton-pickers' harvesters.

The object of the invention is to provide a device of this character upon which the cotton-pickers may ride while picking the cotton and which will protect the pickers from the sun's rays while working and also protects the gathered cotton from rain.

A further object is to provide means whereby the cotton picked may be conducted and discharged into suitable receptacles carried by the harvester.

With the above and other objects in view the invention consists of certain novel features of construction, combination, and arrangement of parts, as will be hereinafter described and claimed.

In the accompanying drawings, Figure 1 is a perspective view of the invention. Fig. 2 is a vertical cross-sectional view of the same, and Fig. 3 is a longitudinal vertical sectional view taken through one of the seat-supporting and conveyer frames.

Referring more particularly to the drawings, 1 denotes supporting-wheels, upon which are mounted a supporting-frame 2, to the upper ends of which is connected a canopy 3. Arranged in the supporting-frame 2 is a series of longitudinally-disposed conveyer-frames 4, of which there may be any suitable number, three of the same being shown in the present instance. The frames 4 are spaced apart to permit of the passage of the same between the rows of cotton-plants.

In the conveyer-frames 4 are arranged suitable conveyers 5, said conveyers being here shown and preferably consist of endless belts or aprons which pass around rollers 6, journaled in the ends of the frames 4.

On th top edges of the sides of the conveyer-frames 4 above the endless conveyers are slidably mounted seat-supporting frames 8, upon which are revolubly mounted seats 9. The seat-frames are provided on their edges with cleats or flanges which are adapted to engage the outer faces of the sides of the conveyer-frames 4, thereby preventing said sides from spreading.

In operation the pickers sit upon the seats 9, from which position they may conveniently reach the cotton on the rows of plants between which the machine is passing. The picked cotton is thrown upon the conveyers 5, by which the same is conveyed to one end of the conveyer-frames and discharged into baskets, bags, or other suitable receptacles, which are adapted to be engaged with said end of the conveyer-frames. If desired, removable elevator-frames 4' may be secured to the ends of the frames 4, upon which the picked cotton may be deposited by the conveyers 5 and from which the cotton may be deposited into suitable receptacles. The endless conveyers 5 are mounted upon the rollers 6 and may be driven by hand or geared to the moving parts of the machine in any suitable manner—such, for instance, as shown in the drawings and consisting of sprocket-wheels 10, fixed on one end of the conveyer-roll shafts at one end of the conveyer-frames. The sprocket-wheels 10 on the outside conveyers are connected by sprocket-chains 11 to sprocket-wheels 12, fixed on the extended ends of the adjacent supporting-wheel shafts. On the conveyer-shaft of one of the outside conveyers is fixed a sprocket-wheel 13, which is connected by a sprocket-chain 14 with a sprocket-wheel 15 on a counter-shaft 16, journaled in the top of the frame 2. On said shaft 16 is mounted a sprocket-wheel 17, around which and the wheel 10 on the central conveyer-shaft is passed a chain 18, whereby motion is imparted to said central conveyer. If desired, the endless conveyers 5 and elevators 4' may be dispensed with and the cotton deposited into the frames 4 and removed by hand when the same have been filled.

To the opposite sides of the seat-frames 8 are secured the ends of a protecting apron or belt 20, which is passed around guide-rollers journaled in the ends of the frames 4, whereby the cotton placed in said frames may be protected from dirt, dust, leaves, &c. The aprons or belts 20 are provided adjacent to the seat-frame and on each side of the same with openings through which the cotton may be deposited into the frames 4 or onto the conveyers 5.

On the framework of the harvester at any suitable point may be secured a weighing device, said device being here shown as a pair of scales 22, secured to the frame 2 of the harvester. To one or both ends of the machine is connected a suitable draft mechanism, to which draft-animals may be hitched to draw the machine through the cotton-field.

By the use of a machine constructed as herein shown and described the pickers will be protected from the rays of the sun and by means of the revolving and sliding seats will be enabled to conveniently reach all of the cotton-pods on the plants by which the machine passes.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A cotton-harvester comprising a wheel-supported frame, a series of troughs or frames spaced apart and adapted to receive the picked cotton, revolving seats mounted on slidable frames supported upon the troughs, an endless conveyer passing around rollers journaled in the ends of the troughs, and inclined conveyers extending from the ends of the frames at one end of the machine, substantially as described.

2. In a cotton-harvester, the combination with a wheeled supporting-frame, of a series of troughs or frames adapted to receive the picked cotton, seats slidably mounted on said frames, and a protecting-apron having its opposite ends attached to the opposite sides of said seat-frames and passing over guide-rollers at the opposite ends of said troughs or frames, said apron having openings formed therein adjacent to said seat-frame, substantially as described.

In testimony whereof I have hereunto set my hand in presence of two subscribing witnesses.

AUGUSTUS G. M. COMBEE.

Witnesses:
  CHAS. C. HARPER,
  N. A. DENNY.